(12) United States Patent
Tiernan (10) Patent No.: US 7,983,668 B2
(45) Date of Patent: Jul. 19, 2011

(54) SYSTEM AND METHOD FOR COLLECTING, ARCHIVING, AND ACCESSING DATA ON BASE TRANSCEIVER STATION PERFORMANCE

(75) Inventor: Francis A. Tiernan, Saratoga, CA (US)

(73) Assignee: Anritsu Company, Morgan Hill, CA (US)

( * ) Notice: Subject to any disclaimer, the term of this patent is extended or adjusted under 35 U.S.C. 154(b) by 959 days.

(21) Appl. No.: 11/847,816

(22) Filed: Aug. 30, 2007

(65) Prior Publication Data

US 2009/0061844 A1    Mar. 5, 2009

(51) Int. Cl.
H04W 24/00 (2009.01)
H04B 17/00 (2006.01)

(52) U.S. Cl. .................................. 455/423; 455/115.1
(58) Field of Classification Search .................. 455/423, 455/115.1
See application file for complete search history.

(56) References Cited

U.S. PATENT DOCUMENTS

| 2003/0054811 A1* | 3/2003 | Han et al. ..................... 455/423 |
| 2003/0157895 A1* | 8/2003 | Agrawal et al. .............. 455/67.1 |
| 2003/0162539 A1* | 8/2003 | Fiut et al. ..................... 455/424 |
| 2005/0114395 A1* | 5/2005 | Muralidharan ............ 707/104.1 |

* cited by examiner

Primary Examiner — Marivelisse Santiago-Cordero
Assistant Examiner — Omoniyi A Obayanju
(74) Attorney, Agent, or Firm — Flieser Meyer LLP (57) ABSTRACT

The present invention is in the field of base station and network infrastructure maintenance. One embodiment is a method, comprising: collecting base transceiver station performance data into a performance analysis and data collection application; transmitting the base transceiver station performance data wirelessly to a mobile application on a mobile device; and uploading the base transceiver station performance data from the mobile application on the mobile device wirelessly over an internet through a mobile network into a web application. One embodiment is a system, comprising: a base station analyzer for measuring base transceiver station performance, wherein the base station analyzer has wireless access to a mobile application on a mobile device; and the mobile application on the mobile device, wherein the mobile application on the mobile device has wireless access through the internet across a mobile network to a web application.

20 Claims, 8 Drawing Sheets

SYSTEM AND METHOD FOR COLLECTING, ARCHIVING, AND ACCESSING DATA ON BASE TRANSCEIVER STATION PERFORMANCE

FIELD OF THE INVENTION

The present invention is in the field of base station and network infrastructure maintenance.

BACKGROUND OF THE INVENTION

Base transceiver stations (BTS) facilitate wireless communication between mobile devices and a mobile network. Mobile devices include mobile phones (including cellular handsets), WLL phones, computers with wireless Internet connectivity, PDA devices, WiFi and WiMAX equipped gadgets, etc. Mobile networks include wireless communication technologies such as GSM, CDMA, WLL, WAN, WiFi, WiMAX, etc. A BTS has the equipment for transmitting and receiving of radio signals (transceiver) and may also have signal processors, signal paths, signal amplifiers, and equipment for system management. The BTS may also have equipment for encrypting and decrypting communications, spectrum filtering tools (band pass filters), etc. Antennas may also be considered as components of BTS in a general sense. Typically a BTS will have several transceivers which allow it to serve several different frequencies. Some base transceiver stations have tower mounted amplifiers to extend the coverage of the uplink signal.

Base transceiver stations play an essential role in mobile network architecture. Industry recognition of that important role has resulted in the development of equipment for base station and network infrastructure maintenance. Instruments have been developed for monitoring the performance of a BTS, including sensors and handheld devices to measure performance data for base transceiver stations. One such handheld base station analyzer is the BTS Master™ from Anritsu Company, Morgan Hill, Calif.

Bluetooth® is a radio standard and communications protocol primarily designed for low power consumption, with a short range, based on low-cost transceiver microchips in each device.

SUMMARY OF THE INVENTION

The present invention is in the field of base station and network infrastructure maintenance. One embodiment is a method, comprising: collecting base transceiver station performance data into a performance analysis and data collection application; transmitting the base transceiver station performance data wirelessly to a mobile application on a mobile device; and uploading the base transceiver station performance data from the mobile application on the mobile device wirelessly over an internet through a mobile network into an application on a web server. One embodiment is a system, comprising: a base station analyzer for measuring base transceiver station performance, wherein the base station analyzer has wireless access to a mobile application on a mobile device; and the mobile application on the mobile device, wherein the mobile application on the mobile device has wireless access through the internet across a mobile network to a web application.

DETAILED DESCRIPTION OF THE INVENTION

In order to analyze base transceiver station (BTS) performance data, previous approaches consisted of capturing performance data in standalone test equipment and then downloading the data to a personal computer (using interface software residing on the personal computer) via a hardware connection such as RS232 or USB. In some cases, the data downloaded to the personal computer is subsequently copied either manually or electronically and transferred into a database on a larger server accessible either through a client server application or an Internet browser. Other systems consisted of measurement hardware connected either directly to a "hardwired" Ethernet port at the base transceiver station, or via an interfacing personal computer to a hardwired Ethernet port. In the case of prior systems using a personal computer, the cost and unreliability of the personal computer are disadvantages. For prior systems that required manual copying and downloading of data, the time involved is a disadvantage. Prior systems operating in an unattended mode at the base transceiver station would become inaccessible in the event of loss of power at the base transceiver station. What is needed is an improved method for collecting, archiving, and accessing base transceiver station performance data.

In one embodiment, a system is composed of the following elements: a base station analyzer for measuring base transceiver station performance, wherein the base station analyzer has wireless access to a mobile application on a mobile device; and the mobile application on the mobile device, wherein the mobile application on the mobile device has wireless access through an internet across a mobile network to an application (including a database) on a web server.

In one embodiment, a method is composed of the following steps: a) collecting base transceiver station performance data into a performance analysis and data collection application; b) transmitting the base transceiver station performance data wirelessly to a mobile application on a mobile device; and c) uploading the base transceiver station performance data from the mobile application on the mobile device wirelessly over an internet through a mobile network into a web application.

Figure 1:
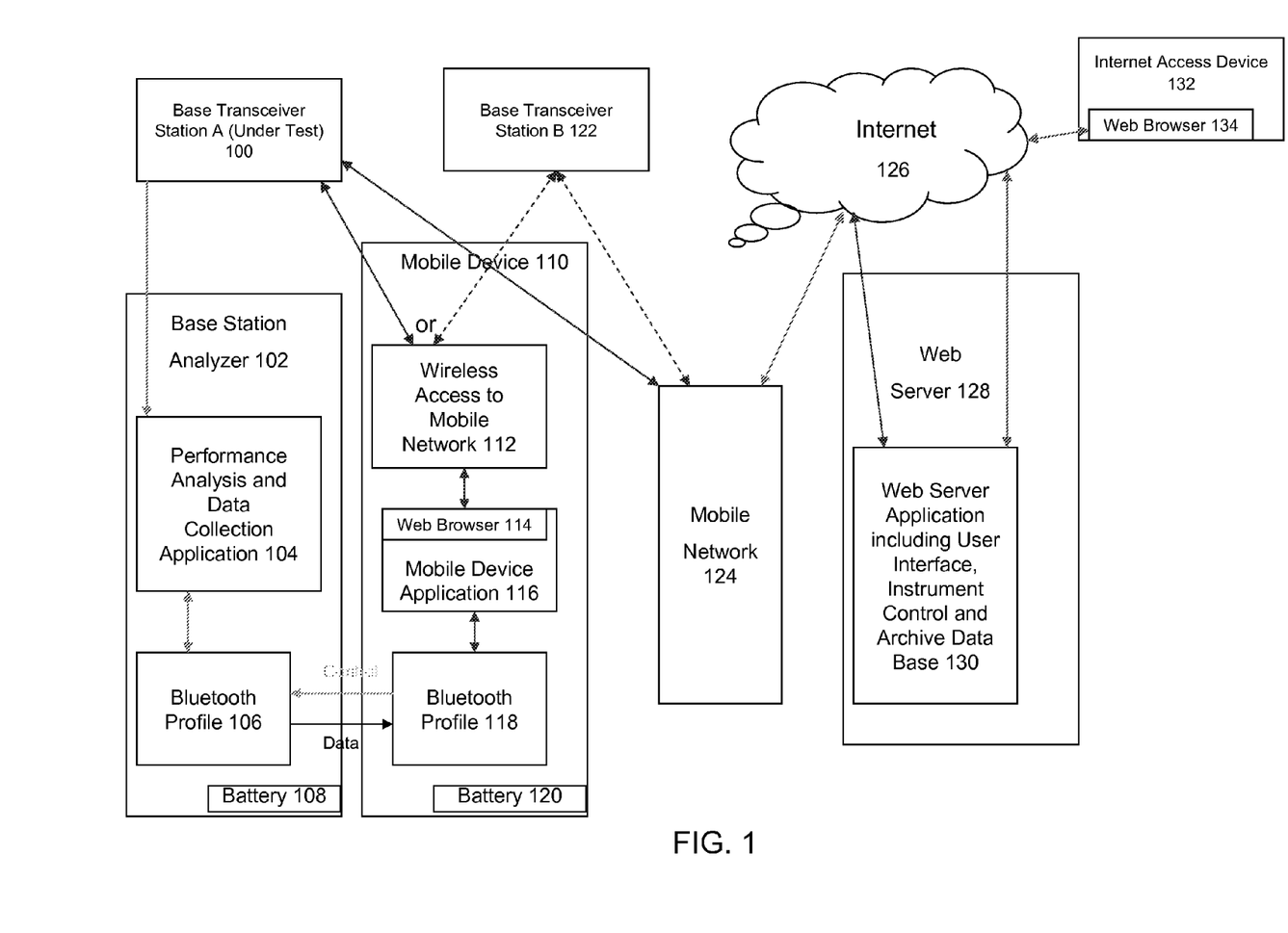
FIG. 1 describes system architecture for one embodiment of the present invention.

FIG. 1 describes the system architecture for one embodiment of the present invention. A base station analyzer 102 measures the performance of base transceiver station A 100. The base station analyzer 102 has performance analysis and data collection application 104 and a Bluetooth® profile 106 to enable wireless communication to Bluetooth™-enabled devices. Base transceiver station performance data is communicated via Bluetooth® to a mobile device 110 with a Bluetooth® profile 118, while control information can be communicated from the mobile device application 116 on the mobile device 110 to the base station analyzer 102. A mobile device application 116 running in the mobile device's web browser 114 receives the performance data and uploads it over the mobile network 124 through the Internet 126 to a user interface, instrument control, and archive application 130 on the web server 128. A user can access the data through the web browser 134 on an internet access device 132. If base transceiver station A 100 is not able to communicate to the mobile network 124, then the mobile device 110 will communicate to the mobile network 124 by communicating through an adjacent base transceiver station B 122. A battery 108 provides backup power for the base station analyzer 102 in the event of a power failure at the base transceiver station. A battery 120 provides backup power for the mobile device 110 in the event of a power failure at the base transceiver station.

Figure 2:
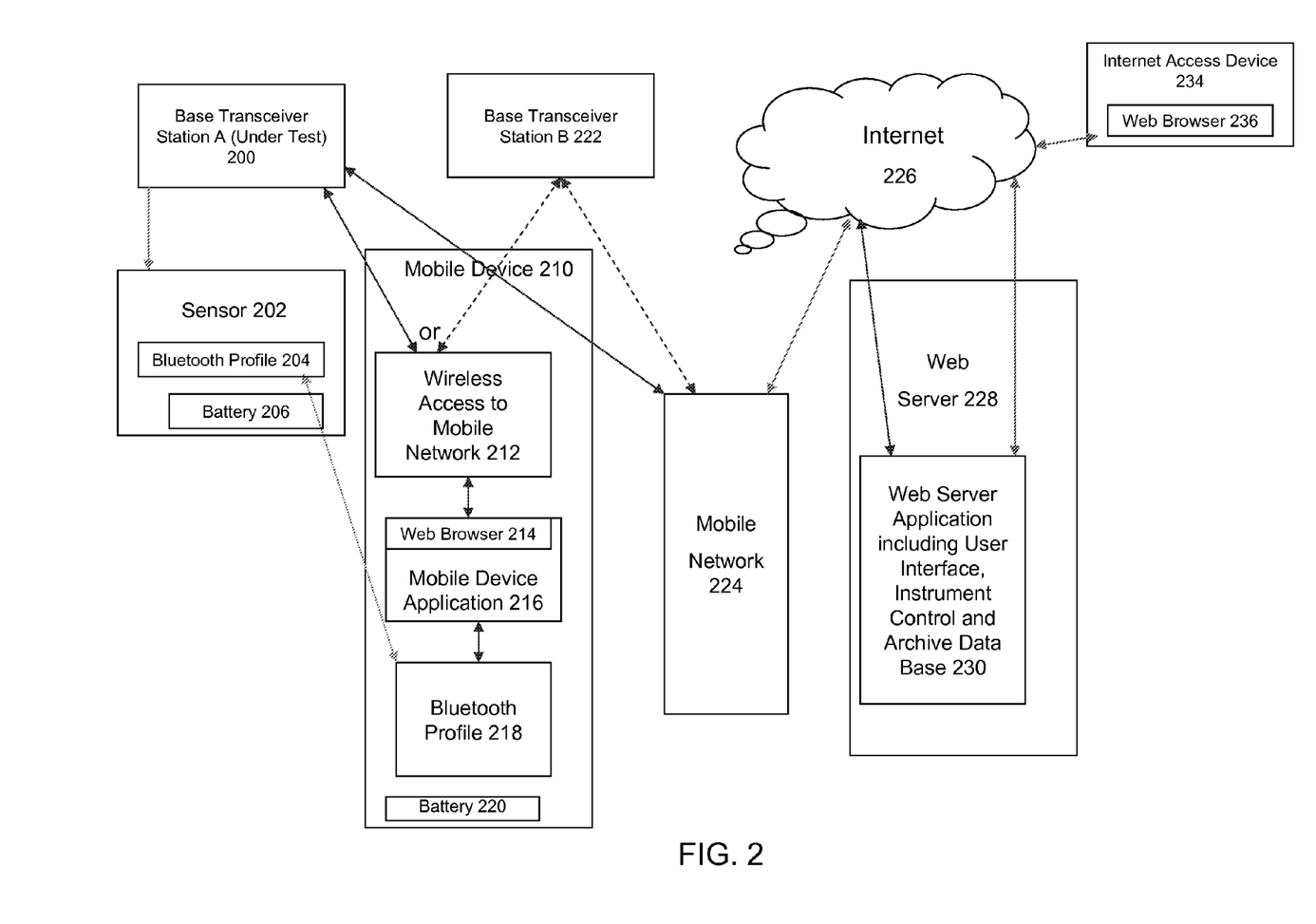
FIG. 2 describes system architecture for one embodiment of the present invention.

FIG. 2 describes the system architecture for one embodiment of the present invention. A sensor 202 with a Bluetooth® profile 204 monitors base transceiver station A 200 and transmits performance data via Bluetooth® to mobile device application 216 running on a mobile device 210 with Bluetooth® profile 218. A mobile device application 216 running in the mobile device 210 receives the performance data and uploads it over the mobile network 224 through the internet 226 to a user interface, instrument control, and archive application 230 on the web server 228. A user can access the data through a web browser 236 on an internet access device 234. If base transceiver station A 200 is not able to communicate to the mobile network 224, then the mobile device 210 will communicate to the mobile network 224 by communicating through an adjacent base transceiver station B 222. A battery 206 provides power for the sensor 202 in the event of a power failure. A battery 220 provides power for the mobile device 210 in the event of a power failure.

Figure 3:
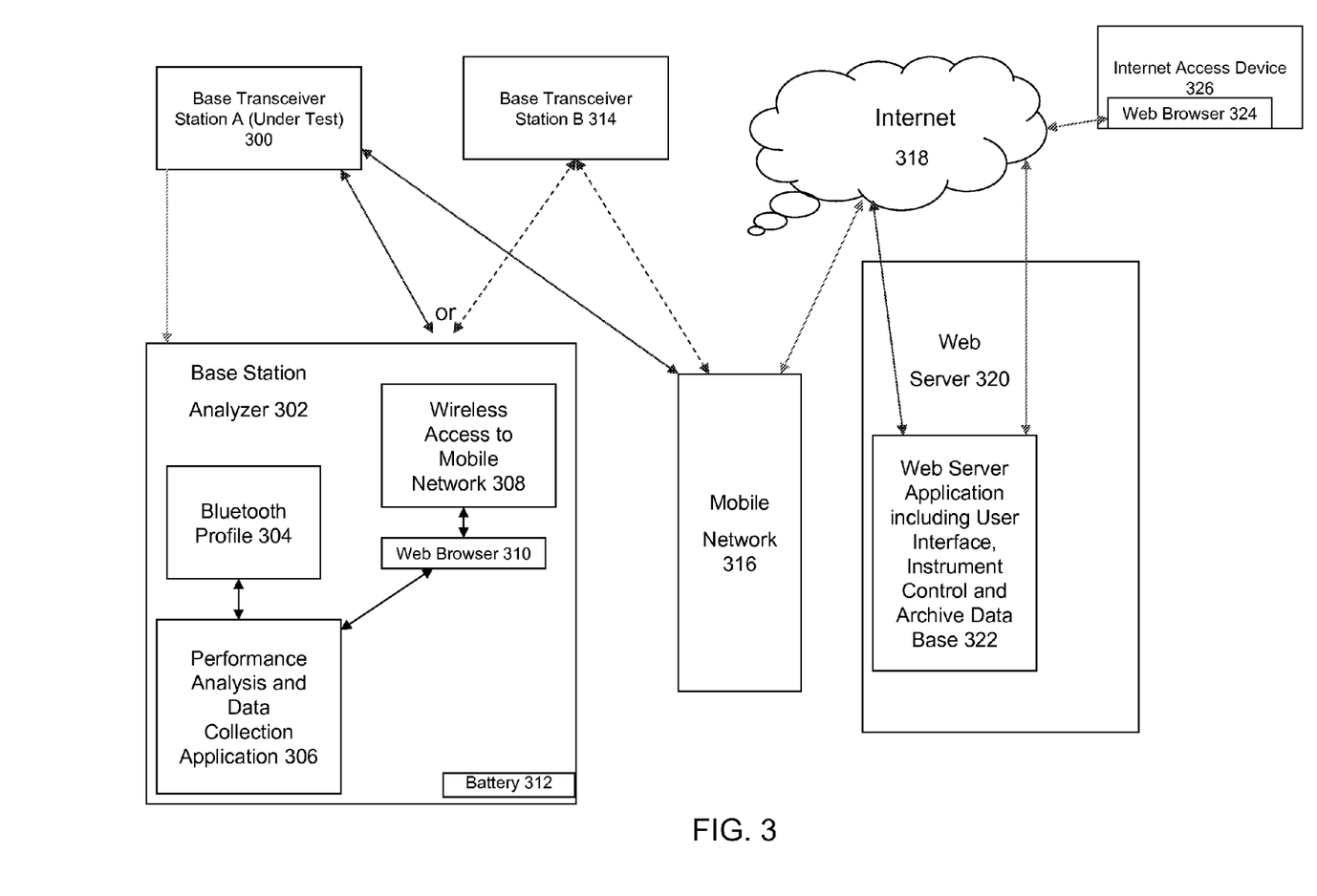
FIG. 3 describes system architecture for one embodiment of the present invention.

FIG. 3 describes the system architecture for one embodiment of the present invention. A base station analyzer 302 measures the performance of base transceiver station A 300. The base station analyzer 302 has performance analysis and data collection application 306, a web browser 310 and wireless access 308 to the mobile network 316. The base transceiver station performance data is communicated over the mobile network 316 through the internet 318 to a user interface, instrument control, and archive application 322 on the web server 320. A user can access the data through the web browser 324 on an internet access device 326. If base transceiver station A 300 is not able to communicate to the mobile network 316, then the base station analyzer 302 will communicate to the mobile network 316 by communicating through an adjacent base transceiver station B 314. A battery 312 provides backup power for the base station analyzer 302 in the event of a power failure at the base transceiver station.

Figure 4:
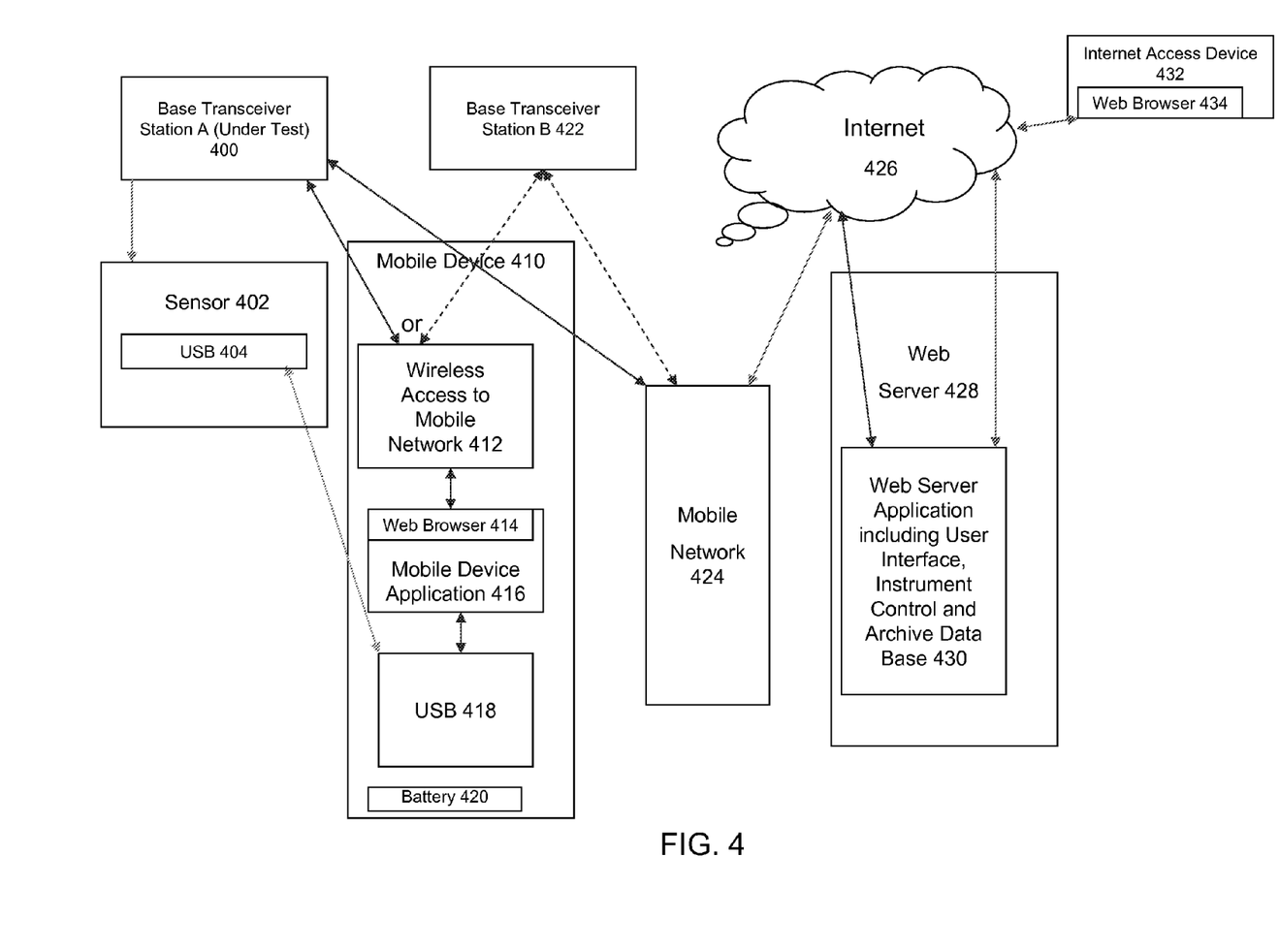
FIG. 4 describes system architecture for one embodiment of the present invention FIG. 5 describes one embodiment of a method for collecting and archiving base transceiver station performance data.

FIG. 4 describes the system architecture for one embodiment of the present invention. A sensor 402 with a Universal Serial Bus (USB) interface 404 monitors base transceiver station A 400 and transmits performance data via a USB connection to mobile application 416 running on a mobile device 410 with USB interface 418. The mobile application 416 running in the mobile device 410 receives the performance data and uploads it over the mobile network 424 through the internet 426 to a user interface, instrument control, and archive application 430 on the web server 428. A user can access the data through a web browser 434 on an internet access device 432. If base transceiver station A 400 is not able to communicate to the mobile network 424, then the mobile device 410 will communicate to the mobile network 424 by communicating through an adjacent base transceiver station B 422. In this embodiment the sensor 440 is powered by the mobile device 410 via the USB. A battery 420 provides power for the mobile device 410 in the event of a power failure.

In one embodiment, the internet access device is a personal computer. In one embodiment, the internet access device is a mobile device. Other alternatives are contemplated. Any device with access to the internet qualifies as an internet access device.

Figure 5:
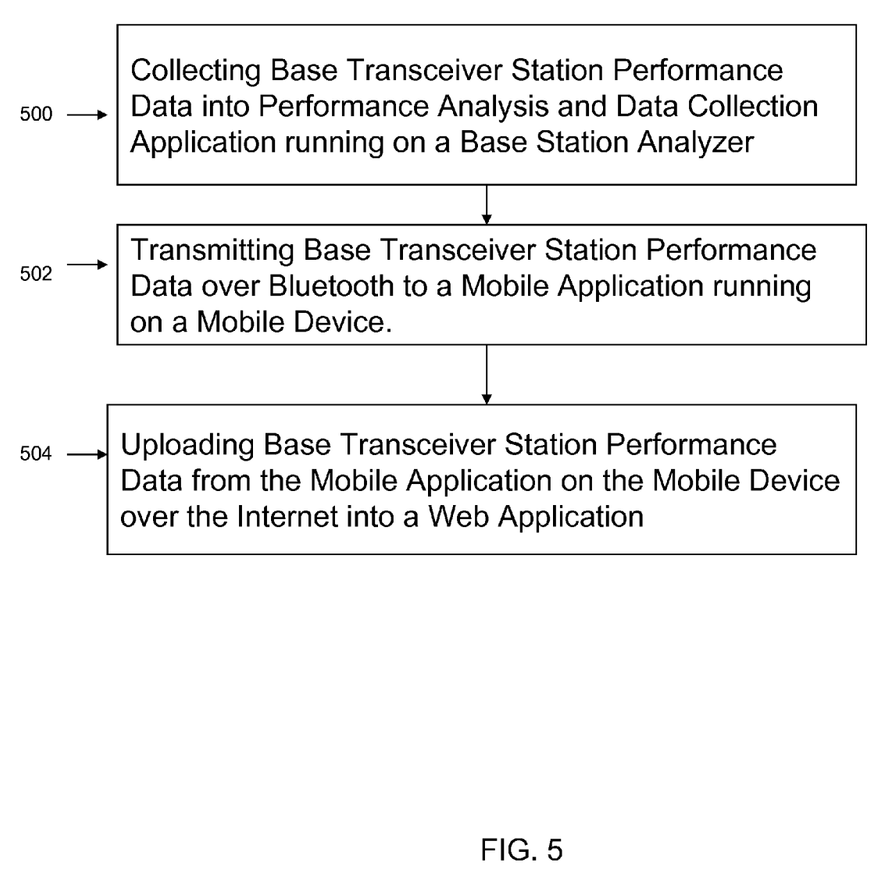

FIG. 5 describes one embodiment of a method for collecting and archiving base transceiver station performance data. The method consists of the following steps: a) collecting base transceiver station performance data into a performance analysis and data collection application 500; b) transmitting the base transceiver station performance data wirelessly to a mobile application on a mobile device 502; and c) uploading the base transceiver station performance data from the mobile application on the mobile device wirelessly over the internet through a mobile network into a web application 504.

Figure 6:
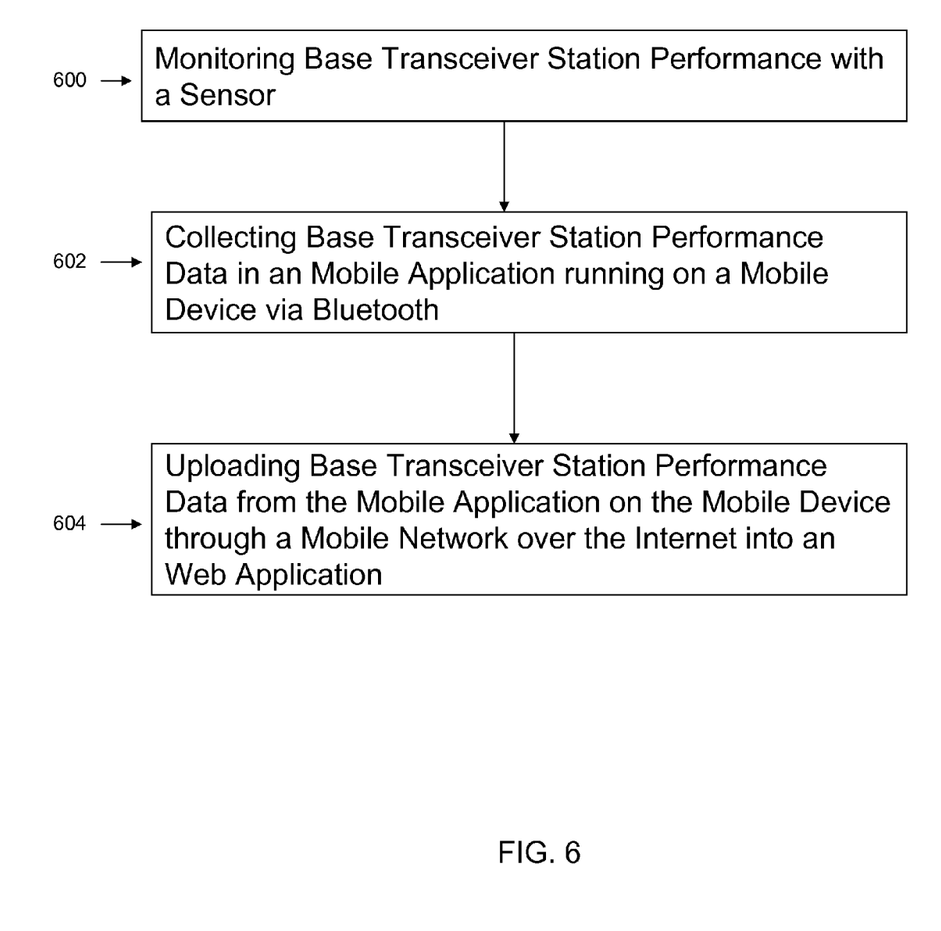
FIG. 6 describes one embodiment of a method for collecting and archiving base transceiver station performance data.

FIG. 6 describes one embodiment of a method for collecting and archiving base transceiver station performance data. The method consists of the following steps: a) monitoring base transceiver station performance with a sensor 600; b) collecting base transceiver station performance data into a mobile application running on a mobile device via Bluetooth® 602; and c) uploading the base transceiver station performance data from the mobile application on the mobile device wirelessly through a mobile network over the internet into a web application 604.

Figure 7:
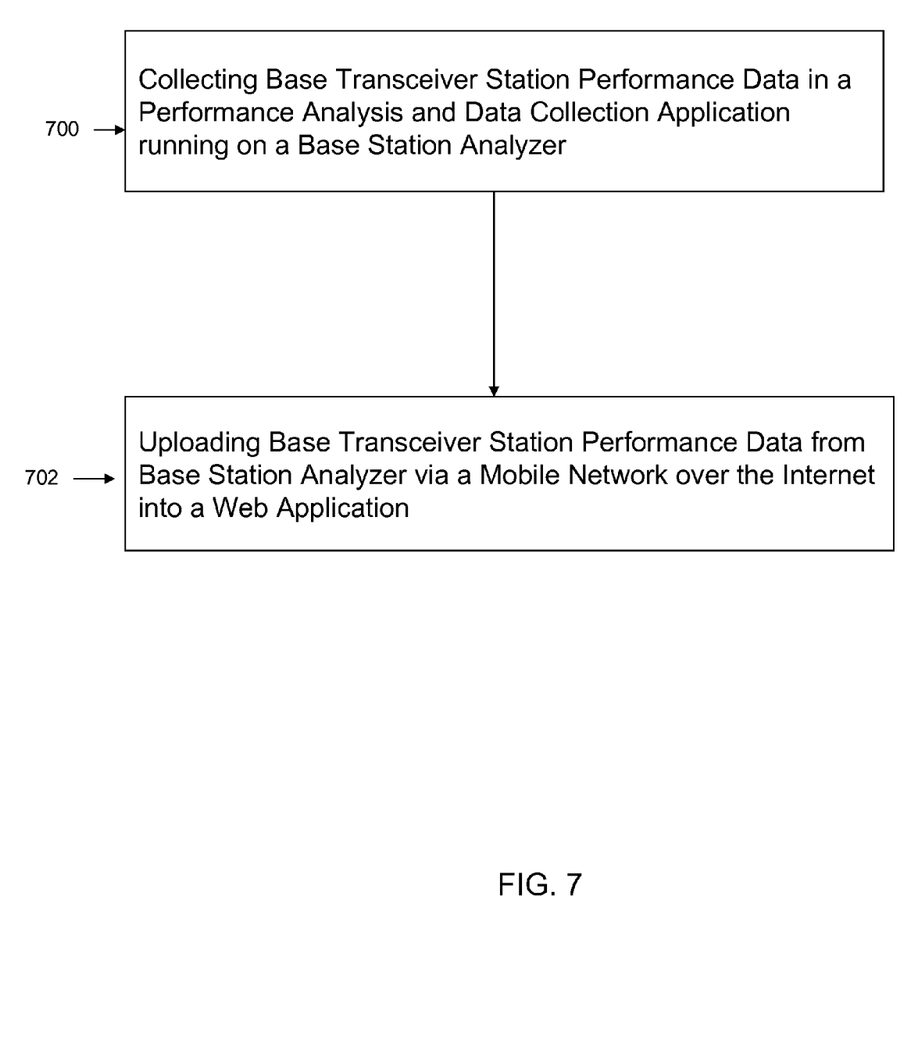
FIG. 7 describes one embodiment of a method for collecting and archiving base transceiver station performance data.

FIG. 7 describes one embodiment of a method for collecting and archiving base transceiver station performance data. The method consists of the following steps: a) collecting base transceiver station performance data in a performance analysis and data collection application running on a base station analyzer 700; and b) uploading base transceiver station performance data from base station analyzer via a mobile network over the internet into a web application 702.

Figure 8:
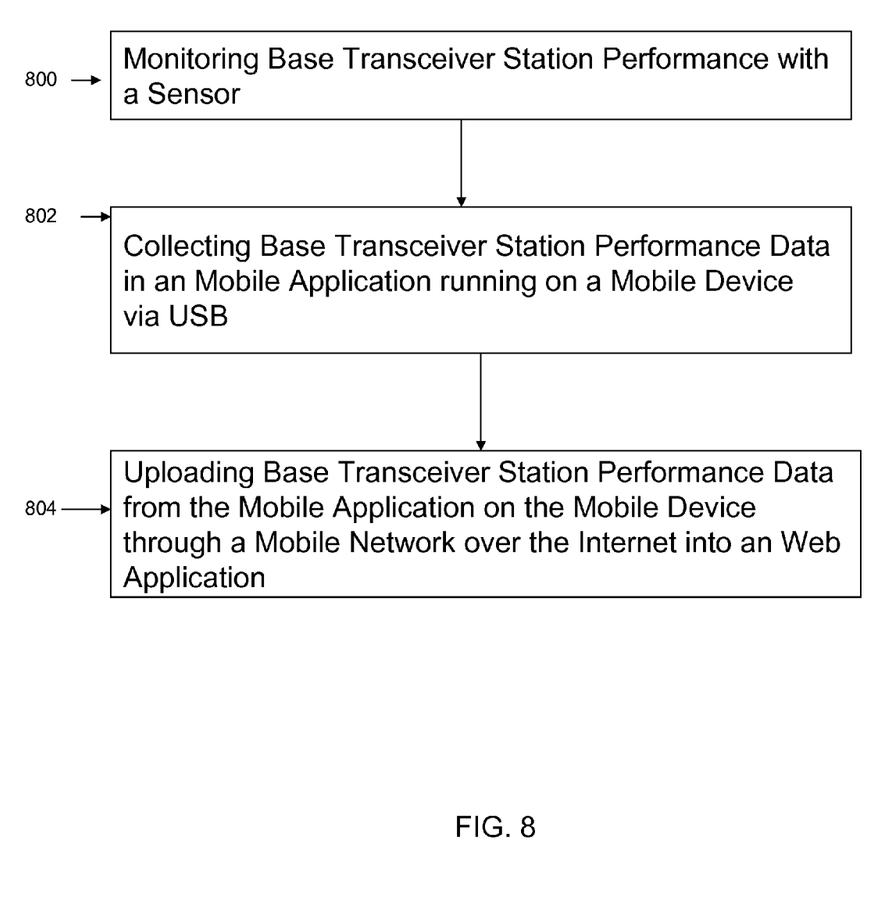
FIG. 8 describes one embodiment of a method for collecting and archiving base transceiver station performance data.

FIG. 8 describes one embodiment of a method for collecting and archiving base transceiver station performance data. The method consists of the following steps: a) monitoring base transceiver station performance with a sensor 800; b) collecting base transceiver station performance data into a mobile application running on a mobile device via USB 802; and c) uploading the base transceiver station performance data from the mobile application on the mobile device wirelessly through a mobile network over the internet into a web application 804.

Performance analysis and data collection would typically be a single application (the performance analysis and data collection application) running on the base station analyzer or in a simplified form on the sensor or mobile device. However, one alternative is a number of applications collaborating together to accomplish these functions. In one embodiment, the functionality is distributed between the sensor, the base station analyzer, the mobile device application, and the user interface, instrument control, and archive application running on the web server. In one embodiment, the mobile device application running on the web browser in the mobile device controls and processes data from the base station analyzer.

Multiple sensors can be used to monitor the performance of the base transceiver station, with each sensor broadcasting data over Bluetooth® to the base station analyzer.

Users can access the web server using their personal computers or handheld devices via the internet. The user interface application (on the web server) allows access to archived data and the option to interact with the base station analyzer or sensor to make "on demand" measurements. The application residing on the web server is used for remote (unattended) control of the base station analyzer and data archiving of data from the base station analyzer.

In one embodiment, the base station analyzer is an integrated multi-functional base station test tool providing spectrum analysis, base station analysis, interference analysis, and power analysis.

In one embodiment, the base station analyzer includes functionality to allow it direct access to the mobile network (in essence a built-in phone).

In one embodiment, the mobile device is a cellular handset and the mobile network is a cellular network.

In one embodiment, a sensor is attached to a port on an amplifier located at a base station. Base stations often have an amplifier mounted on the tower. The amplifier has a port that allows the technician to sample the power coming out of the amplifier for trouble-shooting purposes. The sensor communicates via Bluetooth® to a mobile device. In an alternative embodiment, the sensor communicates via USB to the mobile device.

The mobile device can use the base station's mobile network or another mobile network. One of the most common problems that technicians encounter is when an entire site has lost power. But even in those cases, there are adjacent base stations that the mobile device can communicate with. The benefit of using the base transceiver station's own mobile network to communicate with the measuring equipment is that by default the mobile network will be present wherever there is a base transceiver station. A further benefit of using the mobile network to access the Internet is that even if the local base transceiver station is down due to a local power failure, it is possible that the application on the mobile device could communicate with the mobile network via a neighboring base transceiver station. If the base transceiver station that is being measured is unavailable (because of power failure or other reasons), then the application on the mobile device can upload the performance data to the mobile network through a neighboring base transceiver station. Due to the nature of the mobile network, if for some reason the BTS under test is not functioning, then the mobile device can very likely access the mobile network via a neighboring BTS. This is important because often the problem is that the BTS under test has lost power, in which case it cannot be used to access the mobile network.

In one embodiment, the test equipment manufacturer provides a back end database for the use of the network owner. In one embodiment, the network owner provides a back end database and web application. In one embodiment, a third party, such as an application system provider (ASP), provides the back end database and web application. Numerous technologies that are known to the person skilled in the art could be utilized for creating the performance data collection application, the archive application, and accessing the archive data base, including HTML, Java™, JavaScript™, PHP, XML, Active Server Pages, AJAX, and others. The user interface, instrument control, and archive data base could be one application or many applications that work together. The applications could be on one server or distributed across several servers. The archive data base could be on the web server or on a different server.

In one embodiment, the mobile device is a cellular handset and the mobile network is a cellular network. In some embodiments, the base station analyzer can be under manual, automatic, or remote control while measuring a base transceiver station. In some embodiments, the application on the mobile device either automatically or on demand (locally or remotely) accesses the web application via a mobile network. The connection between the base station analyzer and the cellular handset can be accomplished in any number of ways, including Bluetooth®, WiFi, WiMax, etc.

One embodiment may be implemented using a conventional general purpose computer or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media). The present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner, for example, transmitting digital signals containing the code to a user; providing the code on a physical media to a user; or any other method of making the code available.

Embodiments of the present invention can include a computer-implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code, or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal-containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method, comprising:
    a) collecting base transceiver station (BTS) performance data from a first BTS, using a base station analyzer, wherein the base station analyzer collects the BTS performance data using a performance analysis and data collection application;
    b) transmitting the BTS performance data wirelessly from the base station analyzer to a mobile application on a mobile device over a first wireless network;
    c) connecting, by the mobile device, to an internet via a second wireless network, which comprises a different type of wireless network than the first wireless network, through the first BTS and uploading the BTS performance data from the mobile application on the mobile device directly to a web application on a web server connected to the internet; and
    d) if the mobile device cannot connect to the second wireless network through the first BTS, then connecting by the mobile device to the second wireless network through a second BTS.

2. The method of claim 1, wherein the base station analyzer is a handheld base station analyzer.

3. The method of claim 1, wherein the first wireless network is a Bluetooth® network.

4. The method of claim 1, wherein the first wireless network is a WiFi network.

5. The method of claim 1, wherein the first wireless network is a WiMax network.

6. The method of claim 1, wherein the base station analyzer is manually controlled.

7. The method of claim 1, wherein the base station analyzer is controlled automatically.

8. The method of claim 1, wherein the base station analyzer is remote controlled.

9. A system, comprising:
    a base station analyzer for measuring base transceiver station (BTS) performance, wherein the base station analyzer collects BTS performance data from a first BTS using a performance analysis and data collection application;
    a mobile device which wirelessly connects to, and receives the BTS performance data from, the base station analyzer over a first wireless network; and
    a mobile application on the mobile device, wherein the mobile application
        receives the BTS performance data from the base station analyzer,
        connects, using the mobile device, to an internet via a second wireless network, which comprises a different type of wireless network than the first wireless network, through the first BTS,
        uploads the BTS performance data directly to a web application on a web server connected to the internet, and
    wherein if the mobile device cannot connect to the second wireless network through the first BTS, then connecting by the mobile device to the second wireless network through a second BTS.

10. The system of claim 9, wherein the base station analyzer is a handheld base station analyzer.

11. The system of claim 9, wherein the first wireless network is a Bluetooth® network.

12. The system of claim 9, wherein the first wireless network is a WiFi network.

13. The system of claim 9, wherein the first wireless network is a WiMax network.

14. The system of claim 9, wherein the base station analyzer is manually controlled.

15. The system of claim 9, wherein the base station analyzer is controlled automatically.

16. The system of claim 9, wherein the base station analyzer is remote controlled.

17. A system, comprising:
    a handheld base station analyzer for measuring base transceiver station (BTS) performance, wherein the handheld base station analyzer includes
        a performance analysis and data collection application used to collect BTS performance data from a first BTS, and
        a built-in mobile device which wirelessly connects the handheld base station analyzer to an internet via a mobile network through the first BTS;
    wherein the handheld base station analyzer uploads the BTS performance data directly to a web application on a web server connected to the internet; and
    wherein if the built-in mobile device cannot connect to the second wireless network through the first BTS, then connecting by the built-in mobile device to the second wireless network through a second BTS.

18. A system, comprising:
    a sensor for measuring base transceiver station (BTS) performance, wherein the sensor is configured to monitor a first BTS;
    a mobile device which is configured to communicate with the sensor over a first wireless network and to connect to an internet via a second wireless network, which comprises a different type of wireless network than the first wireless network, through the first BTS;
    a mobile application on the mobile device, wherein the mobile application
        receives the BTS performance data from the sensor,
        connects, using the mobile device, to the internet via the second wireless network through the first BTS, and
        uploads the BTS performance data to a web application on a web server connected to the internet; and
    wherein if the mobile device cannot connect to the second wireless network through the first BTS, then connecting by the mobile device to the second wireless network through a second BTS.

19. The system of claim 18, wherein Bluetooth® is used to communicate wirelessly between the sensor and the mobile device.

20. The system of claim 18, wherein Universal Serial Bus (USB) is used to communicate between the sensor and the mobile device.

* * * * *